United States Patent
Christensen

(10) Patent No.: US 9,957,951 B2
(45) Date of Patent: May 1, 2018

(54) WIND TURBINE

(71) Applicant: Vestas Wind Systems A/S, Aarhus N, (DK)

(72) Inventor: Poul Brandt Christensen, Ry (DK)

(73) Assignee: Vestas Wind Systems A/S, Aarhus N., (DK)

(*) Notice: Subject to any disclaimer, the term of this patent is extended or adjusted under 35 U.S.C. 154(b) by 87 days.

(21) Appl. No.: 15/045,800

(22) Filed: Feb. 17, 2016

(65) Prior Publication Data

US 2016/0169200 A1   Jun. 16, 2016

Related U.S. Application Data

(63) Continuation of application No. 12/771,715, filed on Apr. 30, 2010, now abandoned.

(60) Provisional application No. 61/176,253, filed on May 7, 2009.

(30) Foreign Application Priority Data

May 7, 2009   (DK) .................................. 2009 00592

(51) Int. Cl.
  *F03D 7/02*   (2006.01)
  *F03D 1/06*   (2006.01)
  *F03D 9/00*   (2016.01)
  *F03D 7/04*   (2006.01)
  *F03D 9/25*   (2016.01)
  *F03D 13/20*  (2016.01)

(52) U.S. Cl.
  CPC ............. *F03D 7/0272* (2013.01); *F03D 1/06* (2013.01); *F03D 7/0292* (2013.01); *F03D 7/043* (2013.01); *F03D 9/25* (2016.05); *F03D 13/20* (2016.05); *F05B 2270/1032* (2013.01); *F05B 2270/331* (2013.01); *Y02E 10/721* (2013.01); *Y02E 10/723* (2013.01)

(58) Field of Classification Search
  CPC . F03D 7/0272; F03D 9/25; F03D 1/06; F03D 7/0292; F03D 7/043; F03D 13/20
  See application file for complete search history.

(56) References Cited

U.S. PATENT DOCUMENTS

| | | | | |
|---|---|---|---|---|
| 4,160,170 A | * | 7/1979 | Harner | F03D 7/0224 290/44 |
| 6,619,918 B1 | * | 9/2003 | Rebsdorf | F03D 7/0224 416/1 |
| 2007/0057517 A1 | * | 3/2007 | McNerney | F03D 7/0224 290/44 |
| 2008/0001409 A1 | * | 1/2008 | Schellings | F03D 7/0204 290/44 |

* cited by examiner

*Primary Examiner* — Viet Nguyen
(74) *Attorney, Agent, or Firm* — Wood Herron & Evans LLP

(57) ABSTRACT

A method of controlling a wind turbine having a rotor and a generator for producing power, the wind turbine being designed for a nominal load, the method comprising the steps of: determining a current load acting on at least a part of the wind turbine; calculating a load error, the load error representing the difference between the nominal load and the current load; controlling the wind turbine based on the load error; wherein the step of controlling the wind turbine comprises altering a parameter of the wind turbine so that the power or torque produced by the generator is altered.

12 Claims, 3 Drawing Sheets

WIND TURBINE

CROSS-REFERENCE TO RELATED APPLICATIONS

The present application is a continuation of pending U.S. patent application Ser. No. 12/771,715 filed Apr. 30, 2010, which claims priority under 35 U.S.C. § 119(a) to DK Application No. PA 2009 00592, filed May 7, 2009 and also claims the benefit of U.S. Provisional Application No. 61/176,253, filed May 7, 2009. Each of these applications is incorporated by reference herein in its entirety.

TECHNICAL FIELD

The present invention relates to a method of controlling a wind turbine which is designed for a specific nominal load, i.e., design load. The invention further relates to a control system in accordance with the method and to a wind turbine including such a control system.

BACKGROUND

A wind turbine obtains power by converting the force of the wind into torque acting on the drive train, i.e., on the rotor blades and thus on the main shaft and thereby typically on an electrical generator rotated by the main shaft directly or through a gearbox. The power which the wind turbine receives and which therefore potentially can be transferred to the drive train depends on several conditions including the wind speed and the density of the air, i.e., the site conditions.

Even though a desire to increase productivity requests conversion of the highest possible amount of wind energy to electrical energy, the structural limitations of the wind turbine, i.e., the design loads, define safety limits for the allowed load on the wind turbine. In practice, the wind load depends on various weather conditions including the average wind speed, wind peaks, the density of the air, the turbulence, wind shear, and shift of wind, and the impact of the wind load on the wind turbine and thereby the load on the wind turbine can be adjusted for a current wind condition by changing various settings on the wind turbine.

Even though the loading of a wind turbine is determined by a number of weather conditions and settings on the wind turbine, the wind turbines of today are typically controlled in accordance with a relatively simple and reliable control strategy according to which the turbine is shut down completely at wind speeds above a certain safety value.

Though representing a potentially very safe way of operating a wind turbine, the complete shut down represents drawbacks, e.g., due to the fact that any major change in power production may influence the supplied power grid in a negative way.

SUMMARY

According to a first aspect of the present invention there is provided a method of controlling a wind turbine having a rotor and a generator for producing power, the wind turbine being designed for a nominal load, the method comprising the steps of:

determining a current load acting on at least a part of the wind turbine;

calculating a load error, the load error representing the difference between the nominal load and the current load;

controlling the wind turbine based on the load error;

wherein the step of controlling the wind turbine comprises altering a parameter of the wind turbine so that the power or torque produced by the generator is altered.

According to embodiments of the invention, the wind loads acting on the turbine, or different components of the turbine are monitored and the turbine is controlled in dependence on those current wind loads. This allows the wind turbine to maximise its power production and reduce the loads that it is subjected to, thus increasing the life of the wind turbine. When the power or torque produced by the generator is altered, this means that the instantaneous power or torque produced by the generator is altered. By nominal load or design load, it is meant the load that the wind turbine, or the individual component parts are designed for. An individual turbine may have a nominal load for a first site and a second nominal load for a second site—for example, the turbine in the first site may have a design life of 20 years and in the second site a design life of 25 years. The turbine in the second location is the same as the turbine in the first location, but as it is expected to have a life of 5 more years, the nominal load of the second turbine will be different to the nominal load of the first turbine.

Determining a current load acting on at least a part of the wind turbine may comprise calculating a rain flow count or a standard deviation of a measured load or signal from a sensor over a predetermined period of time, when controlling the wind turbine to account for operational loads.

By "representing" is herein meant that the load error is the difference or at least represents the difference in one or some other way.

If the current load is higher than the nominal load, the power or torque produced by the generator may be decreased such that the current load is equal to or lower than the nominal load. It is the instantaneous power or torque produced by the generator that is reduced. The wind turbine is run less aggressively so that the output power is less and the loads are consequently lower at all wind speeds, thus extending the wind turbine's life by ensuring that the loads acting on the wind turbine are always within the design loads.

If the current load is lower than the nominal load, the power produced by the generator may be increased. It is the instantaneous power or torque produced by the generator that is increased. This could be done by allowing the wind turbine to run aggressively, i.e., to produce more power at all wind speeds when the wind conditions are benign—as the loads acting on the wind turbine during benign wind conditions are lower than the design loads. The power produced by the generator may be increased until the current load is equal to the nominal load.

The parameter of the wind turbine to be altered may be at least one of: a pitch angle of at least one of the rotor blades; the speed of revolution of the rotor; or a power reference of the generator.

The parameter of the wind turbine to be altered may be selected based on the load error. Each parameter to be altered will have a different effect on the power production and the increase/reduction in the loads which the wind turbine is subjected to. By selecting the parameter to be altered based on the actual load error, any production loss can be minimised when the loads are above the nominal loads; or production gain is maximized when the loads are below the nominal loads.

The wind turbine may be designed for a plurality of nominal loads, each of the plurality of nominal loads being associated with a different component of the wind turbine; and the method may further comprise the steps of:

determining a plurality of current loads, each of the plurality of current loads acting on the different components of the wind turbine which are associated with at least one of the nominal loads;

calculating a plurality of load errors for each of the plurality of current loads, each load error representing the difference between the nominal load and the associated current load;

controlling the wind turbine based on the plurality of load errors;

wherein the step of controlling the wind turbine comprises altering a parameter of the wind turbine so that the power or torque produced by the generator is altered.

Preferably, the wind turbine is erected on a location, and the method may further comprise the steps of: defining a plurality of sectors each specifying a range of wind directions towards the wind turbine, defining, for each sector, an expected wind load from the specified directions and a sector control strategy which is based on a predetermined comparison between the expected wind load and the nominal load; determining a current wind direction; before controlling the wind turbine based on the load error, controlling the wind turbine in accordance with the sector control strategy defined for the sector to which the current wind direction corresponds; and then controlling the wind turbine based on the load error.

By first controlling the wind turbine in dependence on what sector the wind turbine is facing, before the control based on the load error, allows the power production to be maximised and the loads to be minimised. This is because the wind turbine has knowledge of the expected wind loads from each sector so it can react quickly, if the control based on the load error is not quick enough to react. The expected wind loads may be known from a site survey such as a meteorological mast, or may have been accumulated over a period of time by the wind turbine itself.

However, the method may further comprise the steps of defining a plurality of sectors each specifying a range of wind directions towards the wind turbine; defining, for each sector, an expected wind load from the specified directions and a sector control strategy which is based on a predetermined comparison between the expected wind load and the nominal load; determining a current wind direction; and after the step of controlling the wind turbine based on the load error, controlling the wind turbine in accordance with the sector control strategy defined for the sector to which the current wind direction corresponds.

By first controlling the wind turbine based on the load error and then controlling the wind turbine based on the sector control strategy allows more control of the turbine. For instance, the control based on the load error may alter the loads so that they are within a certain amount of the design loads, and then the control based on the sector control strategy can alter the loads so that they are even closer to the design loads.

The step of defining for each sector an expected wind load may comprise the step of: determining the current loads acting on at least a part of the wind turbine over a period of time for each sector, and calculating the expected wind load for each sector based on accumulated values of the current loads over the period of time. In this way, the expected wind loads are actually calculated at the turbine over a period of time, rather than being pre-stored in the turbine controller.

The step of controlling the wind turbine in accordance with the sector control strategy defined for the sector to which the current wind direction corresponds may comprise the step of: selecting one control strategy from a plurality of control strategies defined for each sector, wherein the selection is based on the expected wind load. In effect, the selection of the sector control strategy is done at the wind turbine during operation, rather than being pre-stored in the turbine controller.

Each sector control strategy may be defined based on an expected wind load from wind from the corresponding sector of wind directions towards the turbine for a specific geographical location.

A given power output of the wind turbine as a function of wind speed may be defined for a range of wind speeds, the given power output as a function of wind speed being the same for all sectors; and the sector control strategy for each sector controls the wind turbine such that the power output of the wind turbine is either: below the given power output for a given wind speed; or equal to the given power output for a given wind speed; or above the given power output for a given wind speed. By "given power output of the wind turbine as a function of wind speed" is meant the power curve of the wind turbine.

According to a second aspect of the present invention, there is provided a control system for a wind turbine having a rotor and a generator for producing power, the wind turbine being designed for a nominal load, the control system having a control structure adapted to:

determine a current load acting on at least a part of the wind turbine;

calculate a load error, the load error representing the difference between the nominal load and the current load;

control the wind turbine based on the load error by altering a parameter of the wind turbine so that the power or torque produced by the generator is altered.

The control system may be adapted to carry out the activities as described above in relation to the first aspect of the invention.

According to a third aspect of the invention, there is provided a wind turbine, in particular a horizontal type wind turbine, which includes a control system according to the second aspect of the invention or which is controlled in whatever way in accordance with the method of the first aspect of the invention.

BRIEF DESCRIPTION OF THE DRAWINGS

The invention will now be described by way of example with reference to following figures in which.

DETAILED DESCRIPTION

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

Figure 1:
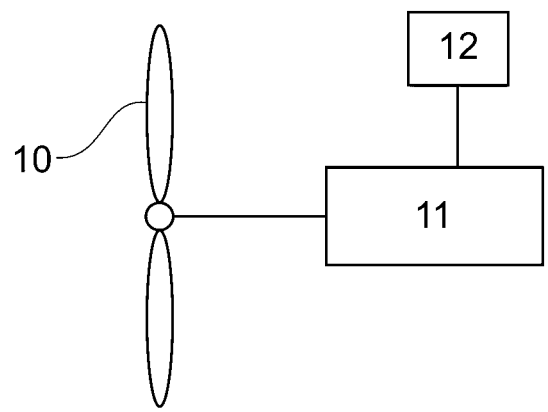
FIG. 1 illustrates schematically a wind turbine rotor and a controller.

FIG. 1 illustrates schematically a wind turbine rotor 10 connected to a controller 11. In a typical horizontal axis wind turbine, a wind turbine rotor comprises three rotor blades and a hub. The hub is connected to a nacelle which is situated at the top of a tower. The nacelle houses the drive train (i.e. the rotating shafts, gearbox and generator) and the control systems for operating the wind turbine.

The controller 11 receives data from various sensors on the wind turbine and these sensors are illustrated schematically as 12.

Figure 2:
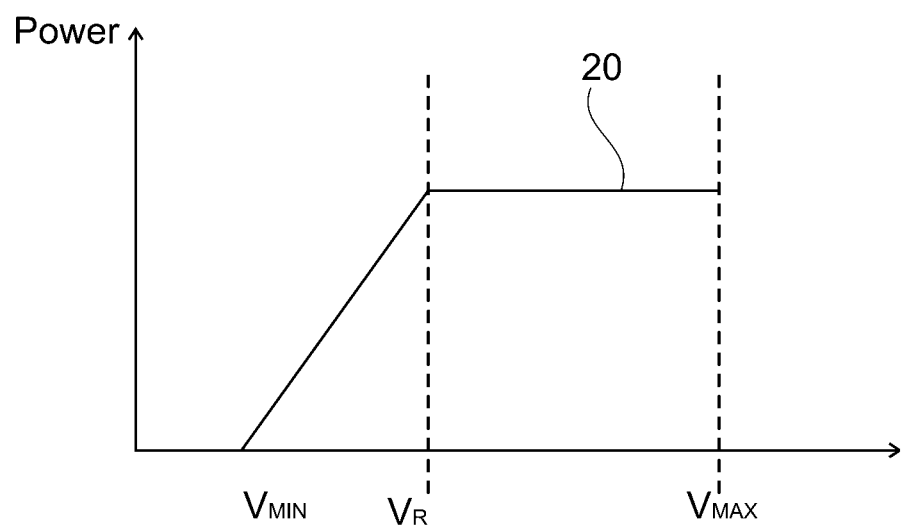
FIG. 2 illustrates a typical power curve of a prior art wind turbine.

FIG. 2 illustrates a power curve of a conventional wind turbine plotting wind speed on the x axis against power on the y axis. Curve 20 is the nominal power curve for the wind turbine and defines the power output by the wind turbine generator as a function of wind speed. As is well known in the art, the wind turbine starts to generate power at a cut in wind speed Vmin. The turbine then operates under part load (also known as partial load) conditions until the rated wind speed is reached at point Vr. At the rated wind speed at point Vr the rated generator power is reached. The cut in wind speed in a typical wind turbine is 3 m/s and the rated wind speed is 12 m/s. At point Vmax is the cut out wind speed, this is the highest wind speed at which the wind turbine may be operated while delivering power. At wind speeds equal to and above the cut out wind speed the wind turbine is shut down for safety reasons, in particular to reduce the loads acting on the wind turbine.

Figure 3:
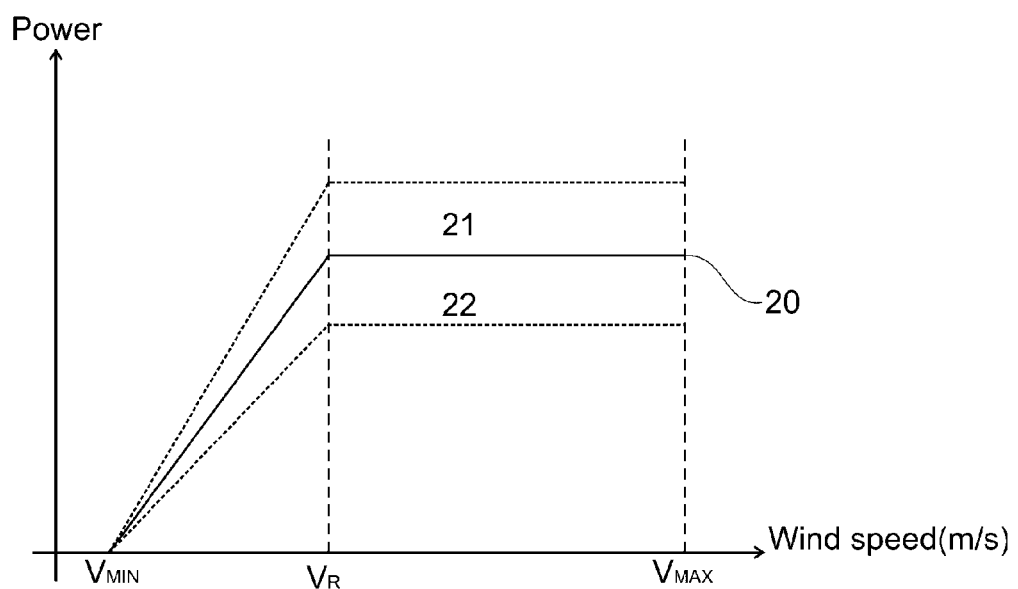
FIG. 3 illustrates a power curve of a wind turbine according to the invention.

FIG. 3 illustrates a power curve of a wind turbine operated according to the present invention. As mentioned above, the power curve 20 is the nominal power curve. A wind turbine is conventionally designed to withstand certain loads, such as the rotor blade root flap bending moment, the tower base bending moment and the main shaft design load. These are the "design or nominal loads" which should not be exceeded, and so the turbine has a nominal power curve, at which the turbine will be operated when experiencing design wind conditions.

As shown in FIG. 3, the turbine is controlled such that it can produce more or less power than the normal power curve in both the part load and the full load regions. The term "over-rating" is understood to mean producing more than the nominal power during full load operation. The term "de-rating" is understood to mean producing less than the nominal power during full load operation. In the invention, the turbine can produce more or less power in both the full load and the part load regions. Thus the term "over-producing" is used to refer to an increase in power production in both the part load and the full load region compared to the normal power curve; and the term "under-producing" is used to refer to a decrease in power production in both the part load and the full load region compared to the normal power curve. When the turbine is over-producing, the turbine is run more aggressive than normal and the generator has a power output which is higher than the nominal power for a given wind speed. The over-producing is shown in FIG. 3 as area 21. When the turbine is under-producing, the turbine is run less aggressive than normal and the turbine generator has a power output which is lower than the nominal power for a given wind speed. The under-producing is shown in FIG. 3 as area 22. It should be noted that the areas 21 and 22 extend into the part load region as well as the full load region. When the turbine is over-producing the loads acting on the turbine are increased and when the turbine is under-producing the loads acting on the turbine are decreased.

Figure 4:
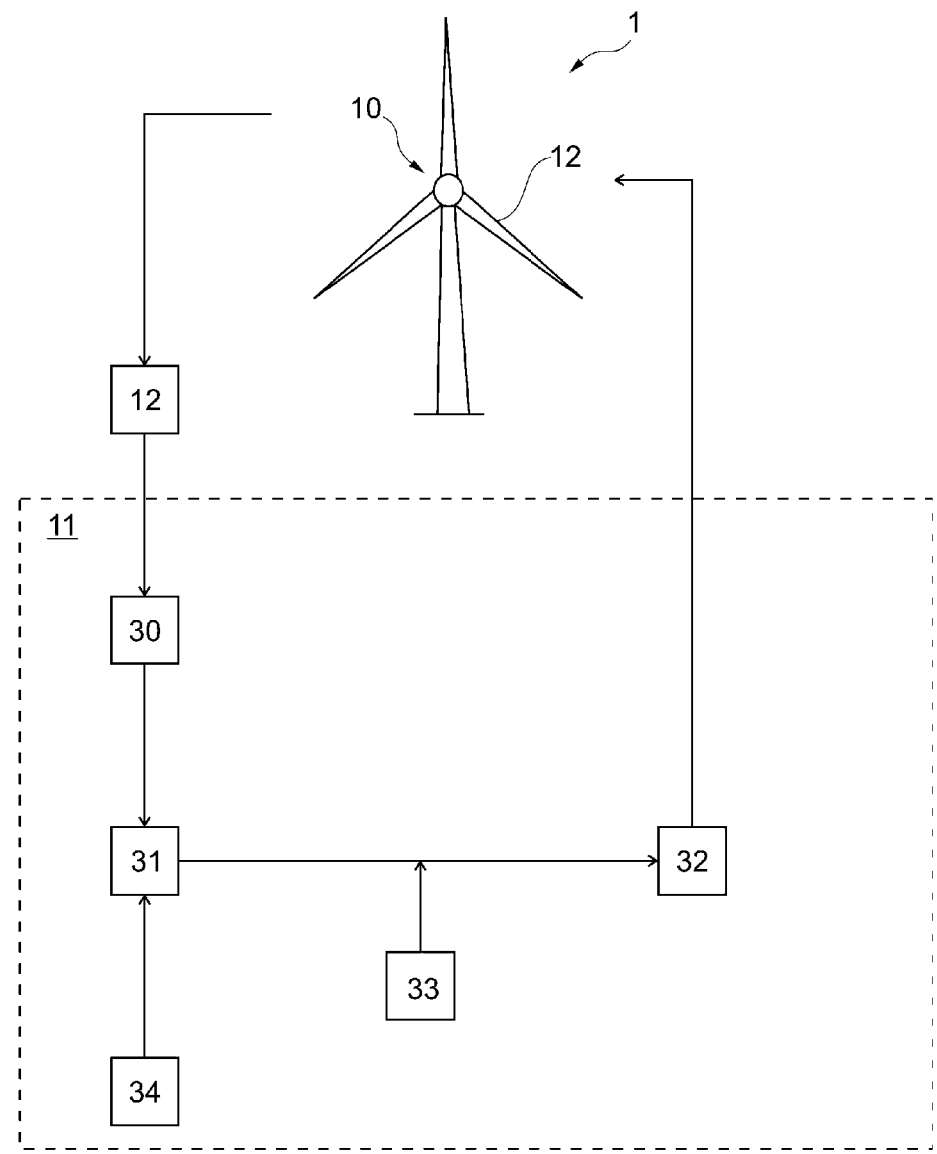
FIG. 4 illustrates a schematic of the control of the wind turbine.

The control method and how the power of the turbine is altered are explained in detail with reference to FIG. 4. FIG. 4 shows a wind turbine 1 having a rotor 10. The controller 11 includes a load estimator 30, a load error calculation unit 31, a load and power control unit 32 and a load supervisor 33.

When the turbine is in operation, the sensors 12 monitor the loads that different components of the turbine are subjected to. These monitored loads are loads that should not be exceeded when the turbine is in operation and include the blade root flap bending moment, the tower base bending moment and the main shaft load. Sensors 12 such as strain gauges, accelerometers and speed measurements record data on the rotor, the tower and the main shaft as is well known in the art, in particular by measuring important variables in the turbine (speed, rotor blade pitch, wind speed, blade flap moment, tower accelerometer etc.). The data from the sensors is input to the load estimator 30 which derives the current load that each component is subjected to.

A memory 34, such as look up table, contains data relating to the design load of each component. This is the nominal load that each component is designed to withstand during normal operation of the wind turbine and should normally not be exceeded.

The load error calculation unit 31 calculates a difference between the design load and the current load of each component. This calculation is based on the load output from the load estimator 30 and the design loads stored in the memory 34.

The load errors are then input into the load and power control unit 32 which contains algorithms for the optimisation of power production while ensuring that none of the loads are above the design loads. The load and power control unit 32 controls a number of parameters which when altered have the effect of changing the power or torque of the generator. This consequently affects that the loads that the turbine is operating under. These parameters can include:

pitch control of the rotor blades about a pitch set point, in part load and full loads operation; or speed control of the rotor about a speed set point, which is controlling the rotor speed about a reference rotor speed. For instance, in part load operation a tip speed ratio of the rotor blades is calculated. The tip speed ratio is the ratio of the speed of the tip of the blades relative to the approaching wind speed. In the part load region the power generated by the turbine can be regulated by the tip speed ratio, so if the rotor speeds up or down, the output power changes; or setting a power reference about a power set point in a converter of the wind turbine which the wind turbine can follow, and setting a pitch angle of the rotor blades; i.e., the power output can be changed dynamically by changing the power reference when there is a converter.

The adjusted parameters which are controlled by the load and power control unit 32 are applied to the wind turbine 1 which has the effect that the turbine will be subjected to new and different loads In use, the signals from the load and power control unit are sent to a conventional wind turbine controller (not shown in FIG. 4) which contains the conventional control algorithms for controlling the wind turbine. These new loads are then measured by the sensors 12 and the load estimator 30 and the process repeats itself.

The load and power controller 32 controls the turbine such that if the current load is higher than the design load for a particular component, the power produced by the generator is decreased so that that the current load is equal to or lower than the design load for that component. In addition, if the current load is lower than the design load for a particular component, the power produced by the generator is increased. This allows the optimisation of the power production because when the turbine is subjected to loads below the design loads, for instance in benign wind conditions, the turbine can over-produce to increase power production. Even though the turbine over-produces, the design loads cannot be exceeded because the loads that the turbine is currently subjected to are constantly monitored. Similarly, when the current loads exceed the design loads, the turbine under-produces so that the generator produces less power—although the turbine under-produces, the loads that the turbine is subjected to are less so that the turbine can continue to produce power without shutting down completely. Accordingly, the turbine is controlled in dependence on the loads acting on the turbine. The controller 11 controls the operation based on measured loads, rather than wind speed.

A conventional wind turbine will typically have a Vmax cut out wind speed of 25 m/s (referring to FIG. 2). However, with the controller 11, the loads can be monitored and if it is determined that at 25 m/s the loads acting on the turbine are not above the design loads, it is not necessary to shut the turbine down. Instead, the turbine can continue to produce power until the current loads reach the design loads. The load supervisor 33 ensures that if a load error is too high for too long, the wind turbine is shut down completely to alleviate loads acting on the turbine.

The load estimator 30 also estimates fatigue and extreme loads acting on the wind turbine components. These should be matched up against the design loads 34 to calculate the load error in the load error calculation unit 31.

In one implementation, the load estimator 30 calculates a rain flow count or a standard deviation of a measured load or signal from a sensor over a predetermined period of time, when controlling the wind turbine to account for fatigue loads. The load estimator 30 may also calculate a risk of an extreme load occurring in the future. The fatigue loads and the "extreme loads risk" are included in the current loads sent to the load error calculation unit 31. An example of the extreme loads risks is the following: a tilt load of 100 (dimensionless amount) is measured and the load estimator 30 calculates (based on the behaviour/statistics of the load signal or wind conditions) for safety that it is 99% certain that the tilt load will not exceed 150. There is no value in knowing what has happened in the past for an extreme load, for example there is no value in knowing that 10 seconds ago a design extreme load was exceeded. It is not possible to estimate extreme loads as they can occur suddenly, for instance if a rotor blade collides with the tower it is too late to alter the control of the wind turbine; instead it is necessary to need to know the risk of a rotor blade hitting the tower.

The fatigue loads and the extreme loads form part of the current loads input to the load error calculation unit.

As mentioned above, the parameters that may be used to control the wind turbine are the speed set point of the rotor, the power set point of the generator and the pitch set point of the rotor blades. The load and power control unit 32 needs to know which parameter should be changed for a given current load condition.

All the parameters that can be changed to control the turbine have a signature associated with them which identifies exactly how and when the parameter is changed, what the effect will be on the power generated by the wind turbine, and the loads acting on the wind turbine. For instance, the load and power control unit 32 will know that if the rotor blades are pitched by a certain amount, what the consequential effect will be on the power generated and the loads acting on the components of the wind turbine. Accordingly, if the loads acting on the wind turbine are high and it is desirable to de-rate the wind turbine to reduce the loads acting on the wind turbine, the parameter selected by the load and power control unit 32 to de-rate the turbine is chosen based on that parameter which will reduce the loads with the lowest cost; where cost refers to the loss in power production.

For example, if the wind turbine experiences high tilt load from wind shear on the rotor, say at 15% above the design load, and it is known that speed de-rating (by changing the speed of the rotor) will change this tilt load by 10% for every 100 rpm de-rating of the generator speed (there is a fixed gear ratio between the rotor rpm and the generator rpm); the load and power control unit would select this tunable and adjust the generator speed reference down by 150 rpm.

A combination of parameters to be changed may also be used. For instance, if power de-rating (by changing the power set point) decreases the tilt load on the turbine by 10% and decreases the power production by 5% and there is another parameter (such as changing the rotor speed) that can be changed that also decreases the tilt load by 10% but only decreases the power production by 4%, the parameter to be selected to control the turbine will be the one that decreases the power production by 4% because the relevant load is decreased below design loads while keeping the lowest production loss.

In addition, if the turbine experiences design loads being exceeded on several main components the controller 11 may need to do several things (i.e., speed de-rate and power de-rate), but the basic concept is still to select the parameters(s) which solve the load issue with the lowest total cost (lost production). Whenever the turbine is experiencing loads below design loads on several components, the controller 11 may do several things (e.g. power over-rating and speed over-rating) to maximize production while keeping loads within design loads.

These signatures are defined before the wind turbine is erected and stored in the load and power control unit 32. They are calculated using computer simulations of a wind turbine over-producing and under-producing and observing what happens with the loads that the wind turbine is subjected to.

However, it is also possible for a generic signature to be assigned to each parameter and during the course of the turbine operating, the signatures can adapt by artificial intelligence.

In a further implementation, the load and power controller 32 can determine how the turbine is controlled based on the direction that the turbine is facing. The area around the turbine is divided up into a number of sectors, for example twelve sectors each of 30 degrees. The load and power controller 32 can store knowledge on each sector relating to the previous current loads the turbine has experienced in that sector. For instance, due to local geographic conditions, when the wind comes from a first sector, A, the loads on the turbine are generally low as the wind loads are benign because the turbulence is low. However, when the winds come from a second sector, B, the loads on the turbine are generally high as the wind loads are high because the turbulence is high or that sector is prone to gusts.

A specific example of the sector control is as follows: The controller 11 operates for one month and during this time the controller 11 identifies that sector A is a very benign sector and therefore the power output of the generator is over-rated to 110% of the nominal power output at a given wind speed. The controller 11 also identifies that in sector B the wind loads are high due to regular gusts and the turbine generator is de-rated to 50% of the nominal power output for a given wind speed to avoid increasing the loads acting on the turbine. The control algorithms in the load and power controller 32 may be very slow because they need a lot of data over time from the sensors 12 to be able to control the turbine, so moving from one sector to another it will take a long time for the wind turbine to adapt to the new sector with the result that the wind turbine may be exposed to critical loads if moving to sector B or the power production will not be optimised if moving to sector A. But, to avoid this time delay problem, if the wind switches from sector A to sector B, the load and power control unit 32 will resume the algorithms from where it left off the last time the turbine was operating in sector B, i.e., at 50% de-rated; and when the wind switches from sector B to sector A the algorithms would 'resume' from last setting when the wind turbine was operating in sector A i.e. 110% over-rated. This sector dependency may also include the possibility of 'season' dependency as well, i.e., the controller 11 knows what time of day or what time of year it is, and what the expected wind loads from each sector will be as a function of time. In a further implementation, a plurality of neighbouring wind turbines in a wind farm are connected. The controllers 11 of each wind turbine are connected to each other and receive data on what the expected wind loads are in each sector. With a plurality of wind turbines, the knowledge of the expected wind load from each sector will be generated faster than a single wind turbine operating alone; so for instance, rather than it taking a month to identify that sector A is a benign sector, it will only take 1 to 2 days to identify that it is a benign sector.

What is claimed is:

1. A method of controlling a wind turbine having a rotor and a generator for producing power, the wind turbine being designed for a nominal mechanical load, the method comprising:
   determining a current mechanical load acting on at least a part of the wind turbine;
   calculating a load error, the load error representing a difference between the nominal mechanical load and the current mechanical load;
   controlling the wind turbine based on the load error to optimize a power production of the wind turbine while also minimizing the load error;
   wherein the step of controlling the wind turbine comprises altering a selected parameter of the wind turbine so that the power or torque produced by the generator is altered, wherein the selected parameter of the wind turbine to be altered is chosen from the following:
   a pitch angle of one or more rotor blades;
   the speed of revolution of the rotor; and
   a power reference of the generator,
   wherein the selected parameter of the wind turbine to be altered is chosen based on the load error, and so as to optimize the power production,
   wherein optimizing the power production during the controlling of the wind turbine is achieved by adjusting the chosen selected parameter over another non-chosen selected parameter when a reduction in the load error can be achieved by adjustment of either of the chosen selected parameter and the another non-chosen selected parameter, but power production losses are less when adjusting the chosen selected parameter than when adjusting the another non-chosen selected parameter.

2. The method of controlling a wind turbine according to claim 1, wherein if the current mechanical load is higher than the nominal mechanical load, the power produced by the generator is decreased such that the current mechanical load is equal to or lower than the nominal mechanical load.

3. The method of controlling a wind turbine according to claim 1, wherein if the current mechanical load is lower than the nominal mechanical load, the power produced by the generator is increased.

4. The method according to claim 3, wherein the power produced by the generator is increased until the current mechanical load is equal to the nominal mechanical load.

5. The method according to claim 1, wherein the wind turbine is designed for a plurality of nominal mechanical loads, each of the plurality of nominal mechanical loads being associated with a different component of the wind turbine; the method further comprising:
   determining a plurality of current mechanical loads, each of the plurality of current mechanical loads acting on the different components of the wind turbine which are associated with at least one of the nominal mechanical loads;
   calculating a plurality of load errors for each of the plurality of current mechanical loads, each load error representing the difference between the nominal mechanical load and the associated current mechanical load; and
   controlling the wind turbine based on the plurality of load errors to optimize the power production of the wind turbine while also minimizing the load errors;
   wherein the step of controlling the wind turbine comprises altering the selected parameter of the wind turbine so that the power produced by the generator is altered, wherein the selected parameter of the wind turbine is chosen based on the plurality of load errors.

6. The method of controlling a wind turbine according to claim 1, wherein the wind turbine is erected on a location, the method further comprising:
   defining a plurality of sectors each specifying a range of wind directions towards the wind turbine;
   defining, for each sector, an expected wind mechanical load from the specified directions and a sector control strategy which is based on a predetermined comparison between the expected wind mechanical load and the nominal mechanical load;
   determining a current wind direction;
   before controlling the wind turbine based on the load error, controlling the wind turbine in accordance with the sector control strategy defined for the sector to which the current wind direction corresponds; and then controlling the wind turbine based on the load error.

7. The method of claim 1, wherein the nominal mechanical load is a constant value.

8. The method of claim 7, wherein the nominal mechanical load is defined by a load value that the wind turbine is designed to withstand, which includes at least one of a rotor blade root flap bending moment, a tower base bending moment, and a main shaft design load.

9. A control system for a wind turbine having a rotor and a generator for producing power, the wind turbine being designed for a nominal mechanical load, the control system having a control structure adapted to:
   determine a current mechanical load acting on at least a part of the wind turbine;
   calculate a load error, the load error representing a difference between the nominal mechanical load and the current mechanical load;
   control the wind turbine based on the load error by altering a selected parameter of the wind turbine so that the power or torque produced by the generator is altered, to optimize a power production of the wind turbine while also minimizing the load error;

wherein the selected parameter of the wind turbine to be altered is chosen from the following:
  a pitch angle of one or more rotor blades;
  the speed of revolution of the rotor; and
  a power reference of the generator,
wherein the selected parameter of the wind turbine to be altered is chosen based on the load error, and so as to optimize the power production,
wherein optimizing the power production during the controlling of the wind turbine is achieved by adjusting the chosen selected parameter over another non-chosen selected parameter when a reduction in the load error can be achieved by adjustment of either of the chosen selected parameter and the another non-chosen selected parameter, but power production losses are less when adjusting the chosen selected parameter than when adjusting the another non-chosen selected parameter.

10. The control system of claim 9, wherein the nominal mechanical load is a constant value.

11. The control system of claim 10, wherein the nominal mechanical load is defined by a load value that the wind turbine is designed to withstand, which includes at least one of a rotor blade root flap bending moment, a tower base bending moment, and a main shaft design load.

12. A wind turbine for converting between wind energy and electrical energy, the wind turbine comprising a control system according to claim 9.

* * * * *